US010531426B2

(12) United States Patent
Zheng et al.

(10) Patent No.: US 10,531,426 B2
(45) Date of Patent: Jan. 7, 2020

(54) SYSTEMS AND METHODS FOR DETECTING MOTION USING WIRELESS COMMUNICATION SIGNALS

(71) Applicant: Marvell World Trade Ltd., St. Michael (BB)

(72) Inventors: Xiayu Zheng, San Jose, CA (US); Xilin Cheng, Menlo Park, CA (US); Zhipei Chi, Sunnyvale, CA (US); Shiyu Xu, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 16/395,579

(22) Filed: Apr. 26, 2019

(65) Prior Publication Data
US 2019/0335417 A1 Oct. 31, 2019

Related U.S. Application Data

(60) Provisional application No. 62/663,177, filed on Apr. 26, 2018.

(51) Int. Cl.
*H04W 48/04* (2009.01)
*H04W 64/00* (2009.01)
(Continued)

(52) U.S. Cl.
CPC ........ *H04W 64/006* (2013.01); *H04B 7/0617* (2013.01); *H04B 17/318* (2015.01); *H04W 4/027* (2013.01)

(58) Field of Classification Search
CPC ....... H04W 4/80; H04W 84/12; H04W 84/18; H04W 48/16; H04W 4/029;
(Continued)

(56) References Cited

U.S. PATENT DOCUMENTS

| 10,108,903 | B1* | 10/2018 | Piao | G06N 3/0454 |
| 10,264,405 | B1* | 4/2019 | Manku | H04W 4/029 |
| 2017/0343658 | A1* | 11/2017 | Ramirez | G01S 13/003 |

OTHER PUBLICATIONS

Bhagyaveni et al., "Performance Improvement of Wireless Sensor Networks Using Layered Space Time Codes", 2009 First International Conference on Networks and Communications, IEEE Computer Society, Dec. 2009, pp. 129-134.
(Continued)

*Primary Examiner* — Quan M Hua (57) ABSTRACT

Embodiments described herein provide a method for detecting motion. At a first wireless communication device capable of wirelessly communicating with a second wireless communication device, channel state information (CSI) for the wireless channel between the first and second wireless communication devices is received. A nulling matrix is calculated based on the received CSI. The calculated nulling matrix is applied to a plurality of short packets scheduled to be periodically transmitted from the first wireless communication device to the second wireless communication device. The first wireless communication device receives, from the second wireless communication device, received signal strength information (RSSI) determined for each of the transmitted plurality of short packets. The method further includes detecting motion based on detecting a change in the RSSI received from the second wireless communication device.

20 Claims, 4 Drawing Sheets

(51) Int. Cl.
*H04B 7/06* (2006.01)
*H04B 17/318* (2015.01)
*H04W 4/02* (2018.01)

(58) Field of Classification Search
CPC . H04W 28/0236; H04W 64/00; H04W 36/30; H04W 4/027; H04W 24/10; H04W 4/026; H04W 4/043; H04W 72/04; H04W 36/08; H04L 43/16; H04L 1/0026; G01S 5/0294; G01S 5/04; G01S 5/14; G01S 19/46
See application file for complete search history.

(56) References Cited

OTHER PUBLICATIONS

IEEE Standard for Low-Rate Wireless Personal Area Networks (WPANs); IEEE Draft P802.15.4-REVc/DF2™, Oct. 2014, 812 pgs.
Lee et al., "Wireless sensing without sensors—an experimental study of motion/intrusion detection using RF irregularity", Measurement Science and Technology, vol. 21, No. 12, Oct. 2010, pp. 1-7.
International Search Report and Written Opinion in PCT/US2019/029234 dated Sep. 12, 2019.

* cited by examiner

SYSTEMS AND METHODS FOR DETECTING MOTION USING WIRELESS COMMUNICATION SIGNALS

CROSS-REFERENCE TO RELATED APPLICATION

This application claims the benefit under 35 U.S.C. § 119(e) of U.S. Provisional Patent Application No. 62/663,177, filed Apr. 26, 2018, which is hereby incorporated by reference herein in its entirety.

FIELD OF USE

The present disclosure relates generally to wireless communications systems and, more particularly, to a method and apparatus for detecting motion using a wireless communication system.

BACKGROUND OF THE DISCLOSURE

The background description provided herein is for the purpose of generally presenting the context of the disclosure. Work of the inventors hereof, to the extent the work is described in this background section, as well as aspects of the description that does not otherwise qualify as prior art at the time of filing, are neither expressly nor impliedly admitted to be prior art against the present disclosure.

Movement detection systems are often installed in homes and/or offices for security with its main purpose being intrusion detections through a door, window, or fence. Traditionally, in the field of private security for indoor spaces, different types of devices capable of detecting an intrusion (or a motion) into a home and/or office are used. For example, one or more of the following types of detection devices may be used:

(1) Volumetric sensors which detect changes in the volume of the measuring area and translate them into motion detection.

(2) Door-opening sensors that detect when a door or window is opened or closed.

(3) Infrared barrier sensors that detect the passage of an object between their transmitters and receivers.

(4) Vibration or glass break sensors that detect vibration in crystals when they are beaten or suffer a break.

(5) Security camera that detect object movement through processing video frames.

These existing systems typically include a plurality of sensors (e.g., passive infrared motion detector, hermetically sealed reed switches, etc.) to be installed in the homes, as well as installation of cameras. Such installations may be prohibitively expensive and require significant installations costs (e.g., installation of Ethernet wires, power cables, etc.).

SUMMARY

Embodiments described herein provide a method for detecting motion. At a first wireless communication device capable of wirelessly communicating with a second wireless communication device, channel state information for the wireless channel between the first wireless communication device and the second wireless communication device is received. A nulling matrix is calculated based on the received channel state information. The calculated nulling matrix is applied to a plurality of short packets scheduled to be periodically transmitted from the first wireless communication device to the second wireless communication device. The plurality of short packets with the nulling matrix applied are periodically transmitted to the second wireless communication device. The first wireless communication device receives, from the second wireless communication device, received signal strength information (RSSI) determined for each of the transmitted plurality of short packets. The method further includes detecting motion based on detecting a change in the RSSI received from the second wireless communication device.

Embodiments described herein also provide a method for detecting motion where the channel state information is obtained by performing a sounding procedure. In some embodiments, performing the sounding procedure includes periodically transmitting a sounding packet from the first wireless communication device to the second wireless communication device to determine characteristics of spatial wireless channels, receiving, in response to the sounding packet, feedback packet from the second wireless communication device derived from wireless channel estimations that are based on received versions of the sounding packet, and determining a steering matrix based on the sounding packet and the feedback packet. A nulling matrix orthogonal to a channel direction is computed based on the determined steering matrix obtained from the sounding procedure. In some embodiments, the sounding packet is transmitted to the second wireless communication device at regular time intervals. In some embodiments, the plurality of short packets is transmitted periodically to the second wireless communication device during each time interval between the transmission of sounding packets.

Embodiments described herein also provide a method for detecting motion based on detecting a change in the received signal strength information by determining the received signal strength at the second wireless communication device for each of the transmitted plurality of short packets, comparing the determined received signal strength at the second wireless communication device to a predetermined threshold received signal strength, and in response to determining that the determined received signal strength at the second wireless communication device exceeds the predetermined threshold, making a movement detection decision.

Embodiments described herein also provide a method for detecting motion based on detecting a change in the received signal strength information by detecting an increase in the determined received signal strength at the second wireless communication device for one or more short packets.

Embodiments described herein also provide a method for detecting motion based on detecting a change in the received signal strength information by determining the received signal strength at the second wireless communication device for each of the transmitted plurality of short packets, comparing the determined received signal strength at the second wireless communication device to historical received signal strength information, and in response to determining that the determined received signal strength at the second wireless communication device deviates from the historical received signal strength information, making a movement detection decision. In some embodiments described herein, the method further includes sounding an alarm in response to detecting motion.

Embodiments described herein also provide a system comprising a receiver, a transmitter, and control circuitry at a first wireless communication device. The receiver at a first wireless communication device capable of wirelessly communicating with a second wireless communication device is configured to receive channel state information and receive received signal strength information from the second wireless communication device. The control circuitry of the first wireless communication device is configured to calculate a nulling matrix based on the received channel state information, apply the calculated nulling matrix to a plurality of short packets scheduled to be periodically transmitted to the second wireless communication device, periodically transmit, via the transmitter at the first wireless communication device, the plurality of short packets with the nulling matrix applied to the second wireless communication device, receive, from the second wireless communication device, received signal strength information (RSSI) determined for each of the transmitted plurality of short packets, and make a movement detection decision based on detecting a change in the RSSI received from the second wireless communication device.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout.

DETAILED DESCRIPTION

This disclosure describes methods and systems for detecting motion using wireless communication signal—e.g., Wi-Fi signals. Wireless local area networks (WLANs, e.g., Wi-Fi networks) typically include an access point (AP) and one or more client stations. The present disclosure describes a movement detection schemes for home security by using Wi-Fi signals from a multi-antenna AP. Although various aspects of the present disclosure are described in context with Wi-Fi signals, other types of wireless communication signals may be used to achieve desirable results—e.g., Bluetooth signals, near-field communication (NFC) signals, cellular communication signals, and the like.

The AP (e.g., a router) is usually required for any home/office WLAN setup. The present disclosure uses the wireless communication between the multi-antenna AP and one or more client stations present within the home/office thereby significantly reducing the costs and installations required for movement detection. In particular, the present disclosure makes use of multi-antenna transmit beamforming procedure (including sounding and steering) in Wi-Fi standards. WLAN standards such as the Institute for Electrical and Electronics Engineering (IEEE) 802.11n, 802.11ac, and 802.11ax Standards describe multi-antenna transmit beamforming procedures (including sounding and steering). Specifically, the AP initiates the transmit beamforming sounding procedure periodically. Traditionally, the transmit beamforming procedures are trying to improve signal strength at the receiver (i.e., at client stations) by applying a steering matrix at the transmitter side (i.e., at the AP).

The present disclosure, in contrast, constructs a nulling matrix (or a nulling vector in the case of a single spatial stream signal) which is orthogonal to a channel direction (i.e., a static channel between the transmitter and the receiver) at the transmitter (i.e., at the AP) based on the steering matrix obtained from a sounding procedure. During the interval of two sounding procedures, AP periodically sends short packets with nulling matrix applied to the receiver. The resulting signal at the receiver is consequently greatly degraded. Thus, movement or intrusion into the home/office would change the static channel (obtained from sounding) and cause the nulling to be sub-optimal. Thus, the signal strength at the receiver (i.e., at the client stations) would be enhanced compared to the optimal nulling scenario, thereby indicating that the presence of movement within the environment. The received signal strength (RSS) is then estimated at the receiver. A signal strength change threshold can be set to determine if motion (or an intrusion) is detected.

Accordingly, a low-cost method of movement detection may be implemented in a home/office using equipment already available and pre-installed in most homes/offices. Moreover, methods and apparatus in accordance with the present disclosure are not limited to line of sight, which is typical of existing motion detection systems which rely on sensors and/or cameras.

Figure 1:
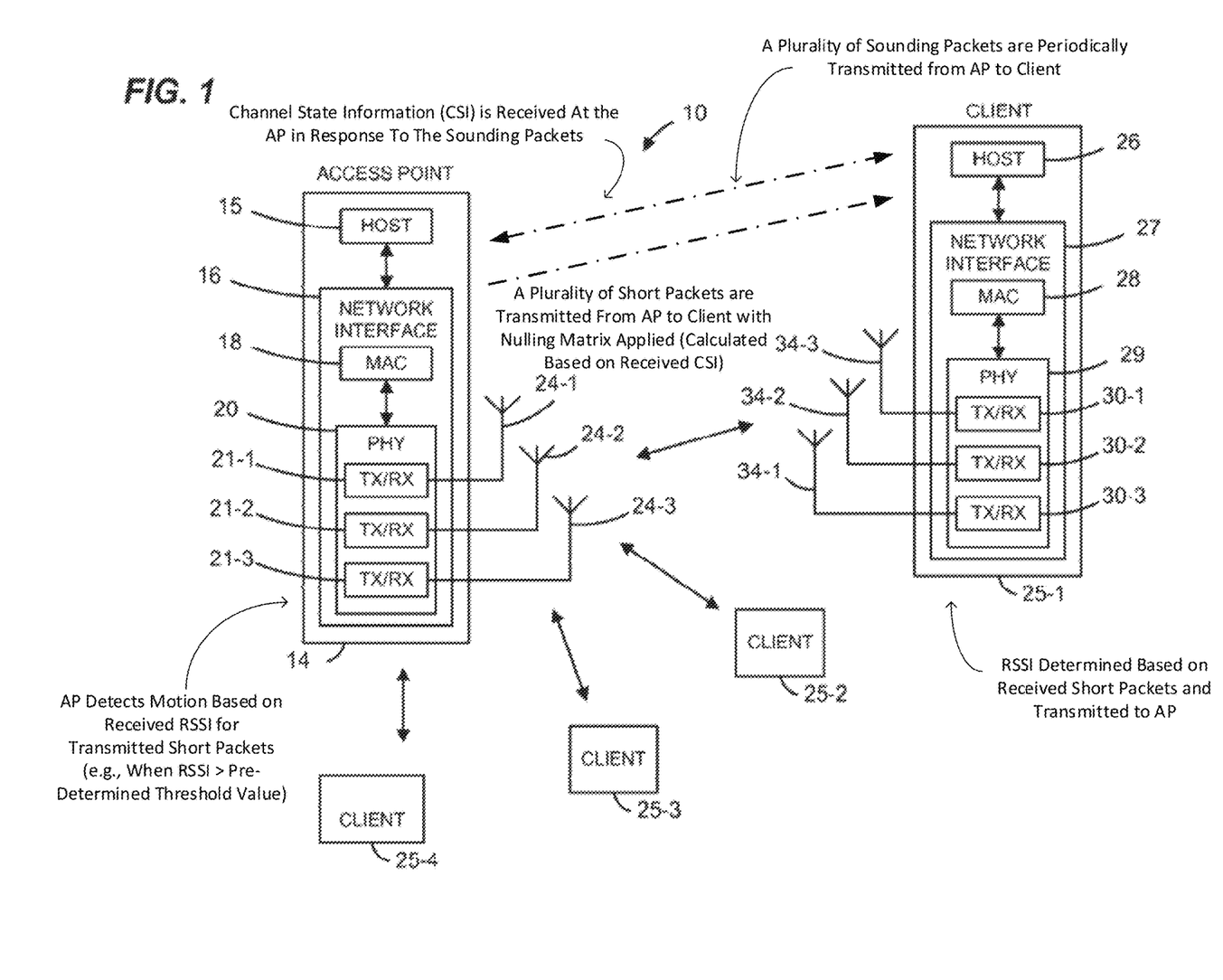
FIG. 1 is a block diagram showing an example of a wireless communication system.

FIG. 1 is a block diagram illustrating an example of a communication system, such as WLAN system 10, according to some embodiments described herein. The WLAN system 10 includes an access point (AP) 14 and multiple clients 25-1, 25-2, 25-3, and 25-4 (collectively clients 25). The AP 14 includes a host processor 15 coupled to a network interface device 16. The network interface device 16 includes a medium access control (MAC) processing unit 18 and a physical layer (PHY) processing unit 20. The PHY processing unit 20 includes a plurality of transceivers 21-1, 21-2, 21-3 (collectively, transceivers 21), and the transceivers 21 are coupled to a plurality of antennas 24. Although three transceivers 21 and three antennas 24-1, 24-2, and 24-3 (collectively, antennas 24) are illustrated in FIG. 1, the AP 14 includes other suitable numbers (1, 2, 3, 4, 5, etc.) of transceivers 21 and antennas 24 in other embodiments. In some embodiments, the MAC processing unit 18 and the PHY processing unit 20 are configured to operate according to a first communication protocol (e.g., IEEE 802.11b). In some embodiments, the MAC processing unit 18 and the PHY processing unit 20 are configured to operate according to a second communication protocol (e.g., IEEE 802.11a). In some embodiments, the MAC processing unit 18 and the PHY processing unit 20 are configured to operate according to third communication protocol (e.g., IEEE 802.11g). In further embodiments, the MAC processing unit 18 and the PHY processing unit 20 are additionally configured to operate according to the fourth communication protocol, a fifth protocol, and/or a sixth communication protocol that supports MIMO communications (e.g., the IEEE 802.11n, 802.11ac, and/or 802.11ax).

The WLAN 10 includes a plurality of client stations 25. The client stations 25 can include access terminals (AT), wireless stations (STAs), mobile stations (MS), or other devices. Although four client stations 25 are illustrated in FIG. 1, the WLAN 10 includes other suitable numbers (1, 2, 3, 4, 5, etc.) of client stations 25 in various scenarios and embodiments. The client stations 25 (e.g., client station 25-1) can be configured to operate according to a communications protocol that supports MIMO communications (e.g., IEEE 802.11n, 802.11ac, or 802.11ax). In some instances, a client station 25 can be configured to operate according to another communication protocol (e.g., IEEE 802.11a, 802.11b, and/or 802.11g).

The client stations 25-1 includes a host processor 26 coupled to a network interface device 27. The network interface device 27 includes a MAC processing unit 28 and a PHY processing unit 29. The PHY processing unit 29 includes a plurality of transceivers 30-1, 30-2, and 30-3 (collectively, transceivers 30), and the transceivers 30 are coupled to one or more antennas 34-1, 34-2, and 34-3 (collectively, antennas 34). Although three transceivers 30 and three antennas 34 are illustrated in FIG. 1, the client station 25-1 includes other suitable numbers (1, 2, 3, 4, 5, etc.) of transceivers 30 and antennas 34 in other embodiments.

In some embodiments, the PHY processing unit 20 of the AP 14 is configured to generate data units conforming to a communications protocol and having corresponding formats. For example, the data units include a preamble that includes a short training field (STF) in a beginning part of the preamble. The PHY processing unit 20 of the AP 14 can use a known, periodic reference sequence (also known as pilot or training sequence) as the STF sequence of the data units. The transceiver(s) 21 is/are configured to transmit the generated data units via the antenna(s) 24. Similarly, the transceiver(s) 21 is/are configured to receive the data units via the antenna(s) 24. The PHY processing unit of the AP 14 is configured to process received data units conforming to the communication protocol and having corresponding formats and to determine that such data units conform to the communication protocol, according to various embodiments.

In some embodiments, the PHY processing unit 29 of the client device 25-1 is configured to generate data units conforming to the communication protocol and having corresponding formats. For example, the data units include a preamble that includes an STF in the beginning part of the preamble. The PHY processing unit 29 of the client device 25-1 can use a known, periodic reference sequence as the STF sequence of the data units. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the communication protocol and having corresponding formats and to determine that such data units conform to the communication protocol, according to various embodiments.

FIG. 1 further illustrates aspects of a method for movement detection, according to some embodiments described herein. As shown in FIG. 1, AP 14 transmits a sounding packet (e.g., sounding packet 202 described below in greater detail with reference to FIG. 2) to client station 25-1. A feedback packet is generated at the client station 25-1 and transmitted to the AP 14. The feedback packet includes channel state information (CSI) for the wireless channel between the AP 14 and the client station 25-1.

AP 14 calculates a steering matrix based on the received channel state information from the feedback packet. Subsequent to the calculation of the steering matrix, AP 14 calculates a nulling matrix based on the calculated steering matrix. For example, as described below, AP 14 calculates the nulling matrix using the Gram-Schmidt process for orthonormalizing the steering matrix.

AP 14 then applies the calculated nulling matrix to a plurality of short packets (e.g., short packets 204 described below in greater detail with reference to FIG. 2) and transmits the short packets to client station 25-1. At the client station 25-1, received signal strength information (RSSI) is determined for each of the received short packets. AP 14 receives RSSI from client station 25-1 for each of the transmitted short packets.

AP 14 then detects motion based on the received RSSI. Under optimal conditions where the wireless channel conditions remain unchanged from the time when the sounding packet was transmitted, the received signal strength (RSS) at the client station 25-1 is expected to be approximately zero. However, AP 14 detects motion (or intrusion) within the home/office when the received RSS information indicates a change in the wireless channel condition (i.e., when the received RSS information shows an increase in the RSS value over the transmission of one or more short packets). Although the above embodiment describes the processing steps being performed by AP 14, in some embodiments, the client station 25-1 can process the RSS information and detect motion without needing to transmit the RSSI to AP 14.

Figure 2:
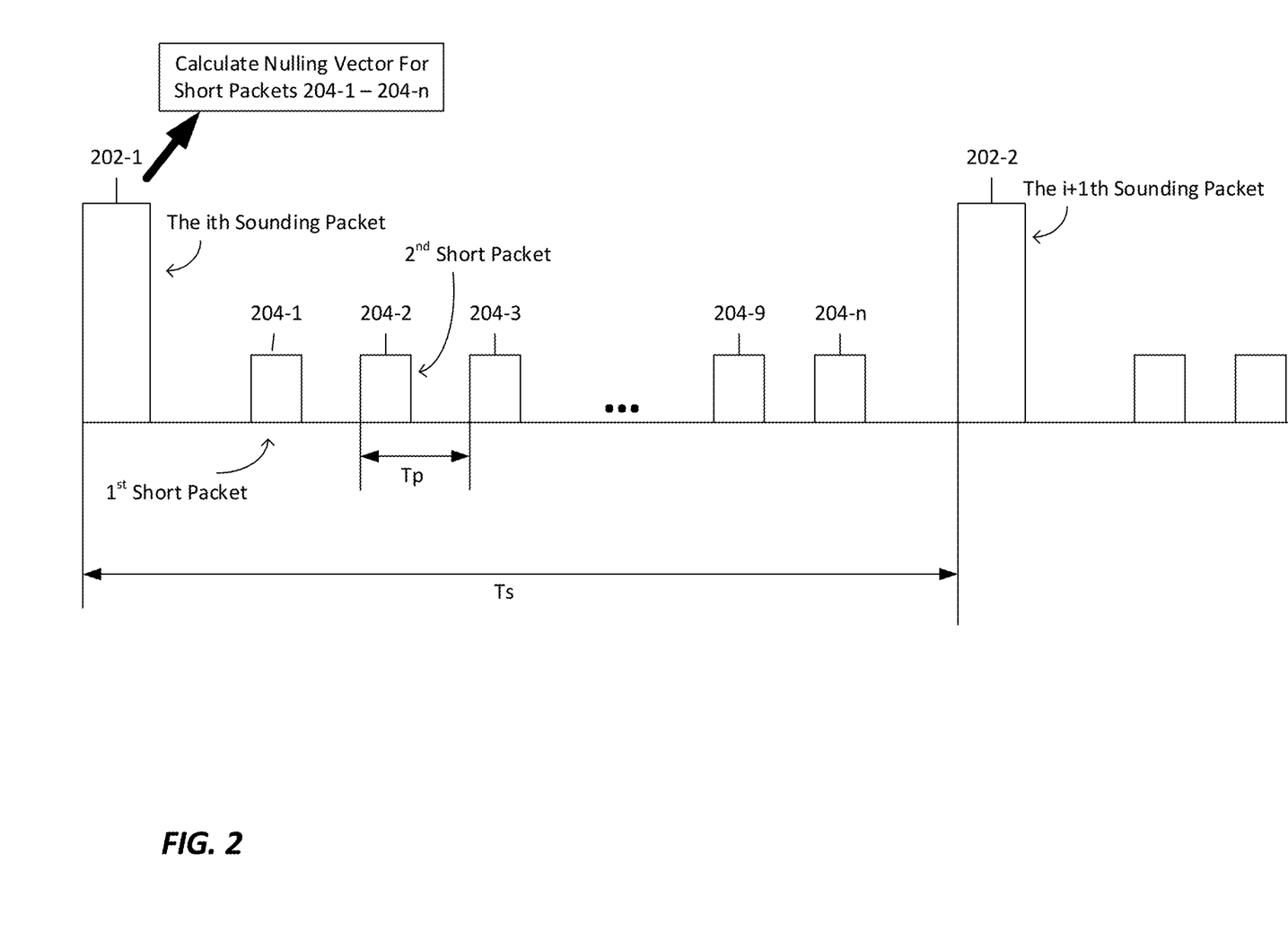
FIG. 2 illustrates an example of an explicit sounding timing diagram.

FIG. 2 illustrates an example of an explicit sounding timing diagram, in accordance with an embodiment of the present disclosure. As illustrated in FIG. 2, AP 14 periodically transmits a sounding packet 202 (i.e., ith sounding packet 202-1, i+1th sounding packet 202-2, etc. (collectively 202)) to one or more client stations 25 periodically (e.g., at time interval Ts). A steering matrix SM is obtained from single user explicit beamforming sounding procedure with IEEE 802.11n/ac/ax type device. In an embodiment, AP 14 may obtain the steering matrix SM from implicit beamforming which requires calibration of a path difference between the transmitter and receiver at AP 14 side. However, in such an embodiment, there is no requirement for support from the client stations 25 and the sounding procedure involves AP 14 triggering and then receiving an uplink packet from the client 25 for steering matrix calculation.

As illustrated in FIG. 2, the sounding procedure is performed with time interval Ts. In various embodiments, the time interval Ts is in seconds or longer, and is a user parameter to set. The sounding procedure is performed periodically to ensure that the static channel between AP 14 and client station 15 is up to date. For each sounding, a nulling vector q(k) is calculated and applied to a plurality of short packets 204 scheduled to be sent periodically to client station 25 during the time interval Ts.

In one embodiment, the nulling vector q(k) for the kth subcarrier can be obtained by Gram-Schmidt process:

$$q_{k,tmp} = (I - v_k \cdot v_k^H) u_0,$$

$$q_k = q_{k,tmp} / \|q_{k,tmp}\|$$

where $v_k$ ($\|v_k\|=1$) is the steering vector (or matrix) from sounding, and $u_0$ is the fixed $N_{tx} \times 1$ vector which could be same or different for different subcarriers (e.g., rotating the columns from a $N_{tx} \times N_{tx}$ unitary matrix.

The short packets 204 are applied with the nulling vector $q_k$ instead of the steering vector (or steering matrix) and are sent periodically with interval $T_P$. The time interval $T_P$ could be in milliseconds or longer and is a user parameter to set. The primary consideration for setting the time interval $T_P$ is to measure a receive signal strength (RSS) at client station 25. In case receiver 34 at client stations 25 needs to decode the received short packets 204 in order to store the RSS measurement, methods and apparatus in accordance with the present embodiments uses the most reliable rate (e.g., modulation and coding scheme with index value of 0 (MCSO)). In one embodiment, the short packets 204 are an Orthogonal Frequency-Division Multiplexing (OFDM) packet (e.g., in accordance with IEEE 802.11n/ac/ax) where the nulling vector $q_k$ can be applied in a standard way for transmit beamforming.

Figure 3:
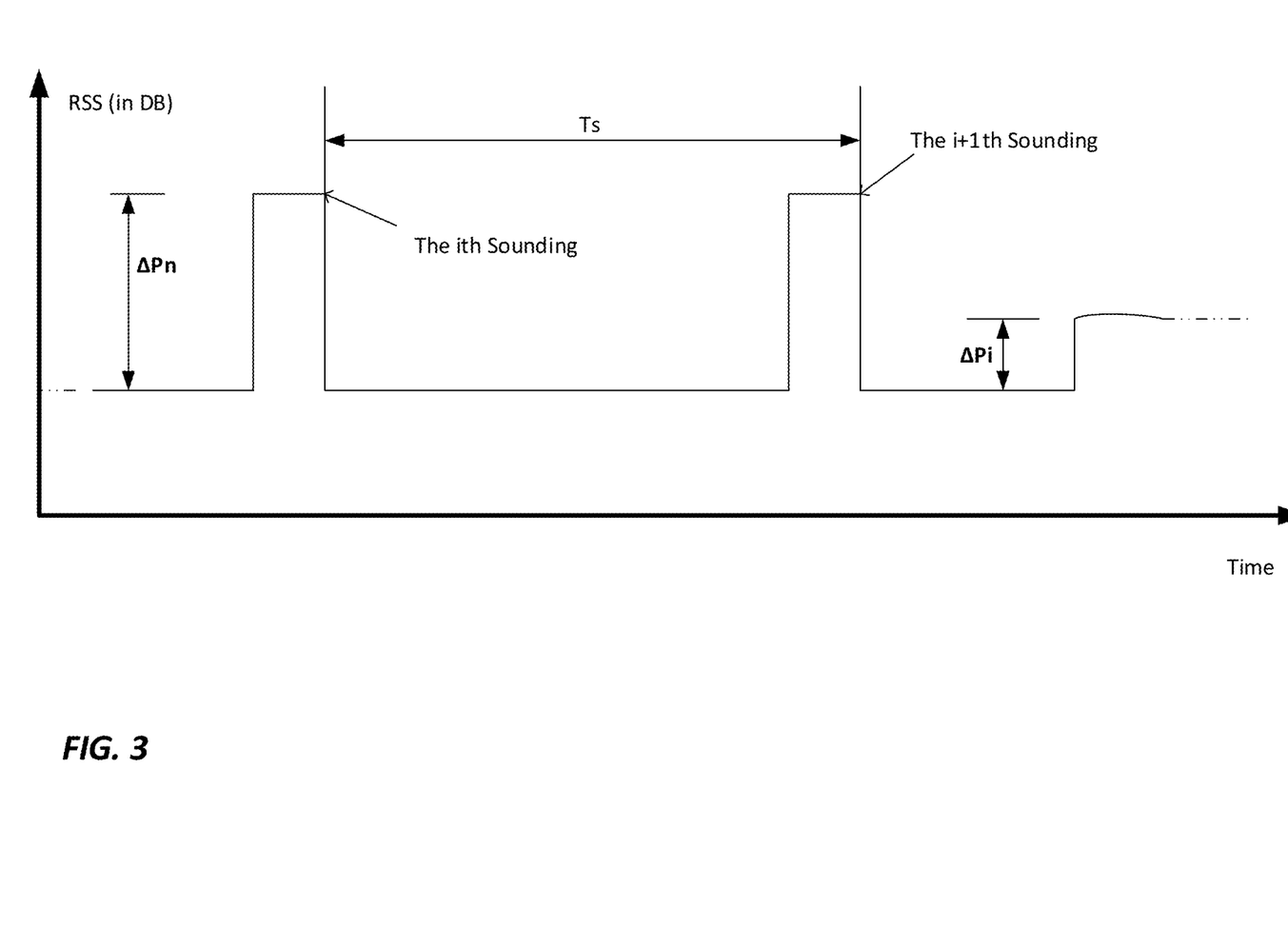
FIG. 3 illustrates an example measurement of signal strength at a client device.

The RSS measurement is usually done in the corresponding HT/VHT/HE portion (for IEEE 802.11n/ac/ax respectively) of the packet where the nulling vector is applied. In other embodiments, the nulling vector is applied on the legacy preamble portion of the short packets 204. FIG. 3 illustrates an example measurement of signal strength at a client device, in accordance with an embodiment of the present disclosure. Specifically, the RSS measured at sounding (e.g., by transmitting a Null Data Packet (NDP) Announcement frame, which is used to gain control of the channel and identify beamformees. Beamformees will respond to the NDP Announcement, while all other client stations 25 will simply defer channel access until the sounding sequence is complete.) and short packets 204 with static channel (i.e., no intrusion) is roughly $\Delta P_n$ dB difference due to the nulling effect. The intrusion causes a change in the static channel conditions which makes the nulling sub-optimal. Accordingly, the RSS at the client stations 25 increases to $\Delta P_i$ dB, as illustrated in FIG. 3.

Accordingly, based on the RSS statistics at the client stations 25, motion (e.g., an intrusion) can be detected based on an amount of change $\Delta P_i$ dB. A number of different methods can be used to detect motion based on the RSS statistics at client stations 25. For example, in one embodiment, motion is detected based on an increase in the RSS over several short packets 204 being greater than a predetermined threshold.

In one embodiment, the system looks at the RSS history over previous sounding intervals and performs a statistical analysis to make an intrusion decision. Specifically, the system observes changes in the RSS measurements over several time intervals Ts. The threshold to decide whether an intrusion happens depends on the distance/original RSS without the nulling vector being applied (e.g., from a NDPA/NDP packets). Typically, when client station 25 is within close range of AP 14 (large RSS value), the channel estimation is more accurate, and the nulling will be more effective on the short packets 204. Therefore, the RSS difference $\Delta P_n$ is larger. In this instance, the small channel change within the sounding interval could cause the RSS bump $\Delta P_i$ and therefore indicate that motion has been detected.

On the other hand, when the client station 25 is at a far range, a bigger channel change is required to have an RSS bump. Therefore, the motion detection may be less sensitive. Accordingly, when the RSS is smaller than the noise floor at the client station 25, it will be capped by the noise floor.

In some embodiments, the motion detection decision is made at the client station 25 instead of the AP 14 if the client station 25 has RSS statistic processing capability. Accordingly, the client stations 25 triggers the alarm system in response to making a determination (or decision) that motion has been detected. In some embodiments, the client stations 25 could send a special packet to the AP before and/or after each sounding about the RSS collections (e.g., for the previous sounding interval) so that the AP 14 can process the RSS statistic to make a decision. In such systems, multiple client stations 25 can be implemented in combination with a single AP 14 to monitor various areas within a home/office.

The proposed methods and apparatus described above can be operated with any bandwidth or in any carrier frequency. Moreover, as noted above, the proposed methods and apparatus can be operated with client stations 25 having multiple receive antennas 34. It is further noted that the nulling vector calculation method described above is intended to be an example only, and that any other method which maps the nulling vector to the orthogonal space of the original channel can be used to perform the disclosed methods. Although the above description describes transmitting the short packets 204 in a single stream, a multi-stream of short packets 204 can also be used—this would require calculating a nulling matrix instead of the nulling vector as described above.

As discussed above, multiple client stations 25 can be employed to improve the detection accuracy. For example, client stations 25 can be allocated at different locations within a home/office to detect the channel change nearby. The sounding for each client station 25 can be separated. In one embodiment, a multi-user sounding procedure can be employed to obtain a respective steering matrix for each client station 25. In such an embodiment, the short packets 204 for each client station 25 can be sent independently for improved performance.

Figure 4:
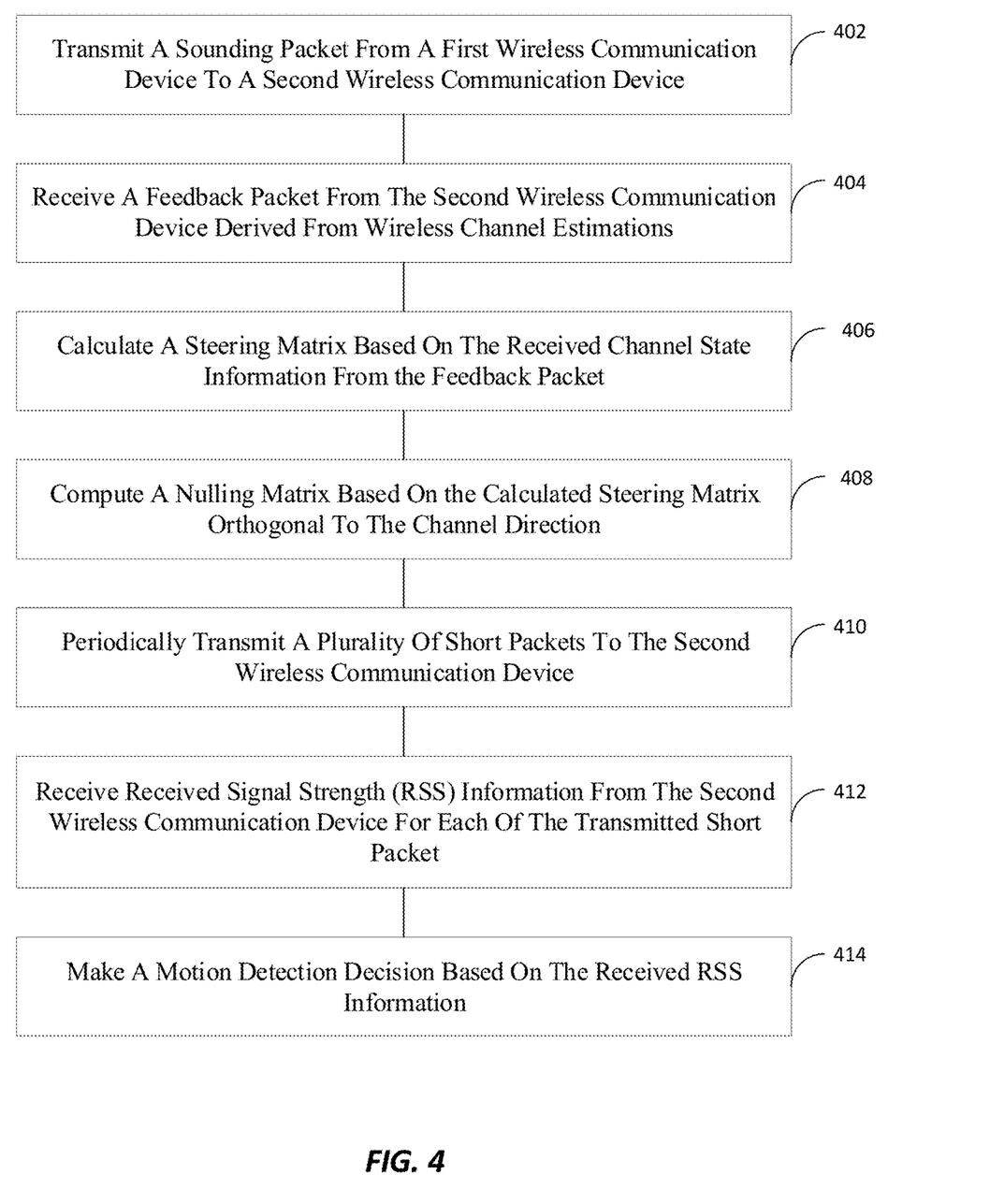
FIG. 4 provides an example logic flow diagram illustrating aspects of a method for movement detection.

FIG. 4 provides an example logic flow diagram illustrating aspects of a method for movement detection, according to some embodiments described herein. At 402, the first wireless communication device (e.g., AP 14) transmits a sounding packet (e.g., sounding packet 202) to a second wireless communication device (e.g., client station 25). At 404, a feedback packet is generated at the client station 25 and transmitted to the AP 14. The feedback packet includes channel state information for the wireless channel between the AP 14 and the client station 25.

At 406, AP 14 calculates a steering matrix based on the received channel state information from the feedback packet. Subsequent to the calculation of the steering matrix, AP 14, at 408, calculates a nulling matrix based on the calculated steering matrix. For example, as described above, AP 14 calculates the nulling matrix using the Gram-Schmidt process for orthonormalizing the steering matrix.

At 410, AP 14 applies the calculated nulling matrix to a plurality of short packets (e.g., short packets 204) and transmits the short packets to client station 25. At the client station, received signal strength information is determined for each of the received short packets. At 412, AP 14 receives RSS information from client station 25 for each of the transmitted short packets.

At 414, AP 14 makes a movement detection decision based on the received RSS information. Under optimal conditions where the wireless channel conditions remain unchanged from the time when the sounding packet was transmitted, the received signal strength (RSS) at the client station 25 is expected to be approximately zero. However, the AP 14 detects movement within the home/office when the received RSS information indicates a change in the wireless channel condition (i.e., when the received RSS information shows an increase in the RSS value over the transmission of one or more short packets). Although the above embodiment describes the processing steps being performed by AP 14, in some embodiments, the client station 25 can process the RSS information to make the movement detection decision.

Various embodiments discussed in conjunction with FIGS. 1-4 are performed by various electronic components of one or more electronic circuits, such as but not limited to an integrated circuit, application-specific integrated circuit (ASIC), DSP, and/or the like. Various components discussed throughout this disclosure such as, but not limited to network devices (e.g., 14, 25 in FIG. 1), and/or the like, are configured to include a set of electronic circuit components, and communicatively operate on one or more electronic circuits. Each electronic circuit is configured to include any of, but not limited to logic gates, memory cells, amplifiers, filters, and/or the like. Various embodiments and components disclosed herein are configured to be at least partially operated and/or implemented by processor-executable instructions stored on one or more transitory or non-transitory processor-readable media.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

The subject matter of this specification has been described in terms of particular aspects, but other aspects can be implemented and are within the scope of the following claims. For example, the actions recited in the claims can be performed in a different order and still achieve desirable results. As one example, the process depicted in FIG. 4 does not necessarily require the particular order shown, or sequential order, to achieve desirable results. In certain implementations, multitasking and parallel processing may be advantageous. Other variations are within the scope of the following claims.

What is claimed is:

1. A method for detecting motion, the method comprising:
   at a first wireless communication device capable of wirelessly communicating with a second wireless communication device, receiving channel state information;
   calculating a nulling matrix based on the received channel state information;
   applying the calculated nulling matrix to a plurality of short packets scheduled to be periodically transmitted from the first wireless communication device to the second wireless communication device;
   periodically transmitting the plurality of short packets with the nulling matrix applied to the second wireless communication device;
   receiving, from the second wireless communication device, received signal strength information (RSSI) determined for each of the transmitted plurality of short packets; and
   making a motion detection decision based on detecting a change in the RSSI received from the second wireless communication device.

2. The method for detecting motion according to claim 1, wherein receiving channel state information comprises performing a sounding procedure.

3. The method for detecting motion according to claim 2, wherein performing a sounding procedure comprises:
   periodically transmitting a sounding packet from the first wireless communication device to the second wireless communication device to determine characteristics of spatial wireless channels;
   receiving, in response to the sounding packet, feedback packet from the second wireless communication device derived from wireless channel estimations that are based on received versions of the sounding packet; and
   determining a steering matrix based on the sounding packet and the feedback packet.

4. The method for detecting motion according to claim 3, the method further comprising:
   computing the nulling matrix orthogonal to a channel direction based on the determined steering matrix obtained from the sounding procedure.

5. The method for detecting motion according to claim 3, wherein the sounding packet is transmitted to the second wireless communication device at regular time intervals.

6. The method for detecting motion according to claim 5, wherein the plurality of short packets is transmitted periodically to the second wireless communication device during each time interval between the transmission of sounding packets.

7. The method for detecting motion according to claim 1, wherein making the motion detection decision based on detecting a change in the received signal strength information comprises:
   determining the received signal strength at the second wireless communication device for each of the transmitted plurality of short packets;
   comparing the determined received signal strength at the second wireless communication device to a predetermined threshold received signal strength; and
   in response to determining that the determined received signal strength at the second wireless communication device exceeds the predetermined threshold, making a motion detection decision.

8. The method for detecting motion according to claim 1, wherein making the motion detection decision based on detecting a change in the received signal strength information comprises:
   detecting an increase in the determined received signal strength at the second wireless communication device for one or more short packets.

9. The method for detecting motion according to claim 1, wherein making the motion detection decision based on detecting a change in the received signal strength information comprises:
   determining the received signal strength at the second wireless communication device for each of the transmitted plurality of short packets;
   comparing the determined received signal strength at the second wireless communication device to historical received signal strength information; and
   in response to determining that the determined received signal strength at the second wireless communication device deviates from the historical received signal strength information, making a motion detection decision.

10. The method for detecting motion according to claim 1, the method further comprising:
    sounding an alarm in response to making the motion detection decision.

11. A system for detecting motion, the system comprising:
    a receiver at a first wireless communication device capable of wirelessly communicating with a second wireless communication device configured to:
       receive channel state information; and
       receive received signal strength information from the second wireless communication device;
    control circuitry configured to:
       calculate a nulling matrix based on the received channel state information;

apply the calculated nulling matrix to a plurality of short packets scheduled to be periodically transmitted to the second wireless communication device;

periodically transmit, via a transmitter at the first wireless communication device, the plurality of short packets with the nulling matrix applied to the second wireless communication device;

receive, from the second wireless communication device, received signal strength information (RSSI) determined for each of the transmitted plurality of short packets; and make a motion detection decision based on detecting a change in the RSSI received from the second wireless communication device.

12. The system for detecting motion according to claim 11, wherein the control circuitry, in response to receiving channel state information is further configured to:

perform a sounding procedure.

13. The system for detecting motion according to claim 12, wherein the control circuitry, when performing the sounding procedure, is further configured to:

periodically transmit, via the transmitter, a sounding packet from the first wireless communication device to the second wireless communication device to determine characteristics of spatial wireless channels;

receive, via the receiver, in response to the sounding packet, feedback packet from the second wireless communication device derived from wireless channel estimations that are based on received versions of the sounding packet; and determine a steering matrix based on the sounding packet and the feedback packet.

14. The system for detecting motion according to claim 13, wherein the control circuitry is further configured to:

compute the nulling matrix orthogonal to a channel direction based on the determined steering matrix obtained from the sounding procedure.

15. The system for detecting motion according to claim 13, wherein the transmitter is configured to transmit the sounding packet to the second wireless communication device at regular time intervals.

16. The system for detecting motion according to claim 15, wherein the transmitter is configured to transmit the plurality of short packets periodically to the second wireless communication device during each time interval between the transmission of sounding packets.

17. The system for detecting motion according to claim 11, wherein the control circuitry, when making the motion detection decision based on detecting a change in the received signal strength information, is further configured to:

determine the received signal strength at the second wireless communication device for each of the transmitted plurality of short packets;

compare the determined received signal strength at the second wireless communication device to a predetermined threshold received signal strength; and in response to determining that the determined received signal strength at the second wireless communication device exceeds the predetermined threshold, make a motion detection decision.

18. The system for detecting motion according to claim 11, wherein the control circuitry, when making the motion detection decision based on detecting a change in the received signal strength information, is further configured to:

detect an increase in the determined received signal strength at the second wireless communication device for one or more short packets.

19. The system for detecting motion according to claim 11, wherein the control circuitry, when making the motion detection decision based on detecting a change in the received signal strength information, is further configured to:

determine the received signal strength at the second wireless communication device for each of the transmitted plurality of short packets;

compare the determined received signal strength at the second wireless communication device to historical received signal strength information; and in response to determining that the determined received signal strength at the second wireless communication device deviates from the historical received signal strength information, make a motion detection decision.

20. The system for detecting motion according to claim 11, wherein the control circuitry is further configured to:

sound an alarm in response to making the motion detection decision.

* * * * *